United States Patent [19]

Stolzer

[11] 4,372,724

[45] Feb. 8, 1983

[54] APPARATUS AND METHOD FOR STORING ROD STOCK AND SUPPLYING SAME TO A SERVICING MACHINE

[75] Inventor: Paul Stolzer, Achern, Fed. Rep. of Germany

[73] Assignee: Stolzer Lagertechnik Gesellschaft mit beschränkter Haftung, Achern, Fed. Rep. of Germany

[21] Appl. No.: 162,199

[22] Filed: Jun. 23, 1980

[30] Foreign Application Priority Data

Jun. 23, 1979 [DE] Fed. Rep. of Germany ....... 2925469

[51] Int. Cl.³ .......................... B65G 65/00; E04H 6/00
[52] U.S. Cl. ................................... 414/281; 414/786; 414/276; 414/278; 414/279; 414/254
[58] Field of Search ................................ 414/266-267, 414/273-276, 277-282, 232, 254, 259, 264, 786, 910-911

[56] References Cited

U.S. PATENT DOCUMENTS

| | | | |
|---|---|---|---|
| 2,923,421 | 2/1960 | De Roumefort | 414/232 |
| 3,445,010 | 5/1969 | Alstedt et al. | 414/282 |
| 3,608,749 | 9/1971 | Zollinger | 414/277 |
| 3,734,312 | 5/1973 | Hickinbotham | 414/267 |
| 3,738,506 | 6/1973 | Cornford et al. | 414/273 |
| 3,977,542 | 8/1976 | Stolzer | 414/281 |
| 3,993,201 | 11/1976 | Bauer et al. | 414/282 |
| 4,014,442 | 3/1977 | Adelson et al. | 414/282 |
| 4,252,486 | 2/1981 | Soligno | 414/282 |
| 4,265,582 | 5/1981 | Theobald | 414/279 |

FOREIGN PATENT DOCUMENTS 1290877 7/1969 Fed. Rep. of Germany ...... 414/282

Primary Examiner—Trygve M. Blix
Assistant Examiner—R. B. Johnson
Attorney, Agent, or Firm—Spencer & Kaye

[57] ABSTRACT

An installation for storing a variety of elongate rod stock and for automatically supplying such stock in a selected sequence to a severing machine which is spaced from the installation, the rod stock being stored in the installation with their longitudinal dimensions all parallel to one another and to the direction of the severing machine, and the installation being composed of a group of vertically extending shelving units spaced from one another in a direction transverse to the direction toward the severing machine, each shelving unit presenting a plurality of compartments spaced vertically from one another, a gantry crane including a crane bridge movable between the compartments for conveying stock to and from each compartment, and a rollway associated with one of the shelving units, arranged to convey stock to and from the severing machine, and vertically movable between a raised position and a lowered position. The shelving compartments, the rollway, the gantry crane components which support stock and a carrier being so constructed as to permit the gantry crane components to move vertically between the supporting arms of the compartments and the rollers of the rollway and to permit the rollers of the rollway to move between supporting members of the carrier in a manner to permit stock to be transferred from the gantry crane to the rollway by movement of the gantry crane components downwardly past the rollers, as well as from the rollway to the carrier and from the carrier to the components of the gantry crane.

12 Claims, 5 Drawing Figures

APPARATUS AND METHOD FOR STORING ROD STOCK AND SUPPLYING SAME TO A SERVICING MACHINE

BACKGROUND OF THE INVENTION

The invention relates to an installation for storing rod stock and for the automatic, program-controlled supplying of a severing machine with this stock. Such installations are composed of a plurality of shelving units arranged side by side transversely of the longitudinal direction of the stock, having shelving compartments arranged one above the other on at least one side and formed of carrier arms, with stock of one material and one cross section being stored in each compartment, a gantry crane with a crane bridge movable upwardly and downwardly over the shelving units, transversely of the shelving gangways and in the shelving gangways, provided with means for taking up the stock from the shelving compartments, for transporting it and for replacing it in the shelving compartments, and a rollway occupying the position of one shelving compartment, drivable in both directions of rotation and essentially forming a horizontal carrier, for feeding stock laid upon it to the severing machine and for bringing back the material from the severing machine after it has been worked therein, the severing machine being arranged with respect to its longitudinal direction, outside the zone occupied by the shelving units and the gantry crane.

Known installations of this kind operate completely automatically with the aid of their program control system, which is controlled for example by the insertion of order cards which indicate the material, stock cross section and number of pieces to be cut. On the basis of such an order card, the gantry crane picks up the stock to be worked and lays it upon the rollway, whence it is then fed to the severing machine. After working, the stock is brought back again into the storage zone by the rollway and then returned to its original place by the gantry crane.

This sequence of movement requires a considerable time before the worked stock has been brought back to its place and the stock to be worked next has been brought to the rollway.

To deal with this problem it has in fact already become known to keep one or two compartments free in the vicinity of the rollway for the interim storage of stock so that then the stock to be worked next can be brought into one of those compartments while the previously selected stock is still being worked. Then the worked stock can be brought by the gantry crane into the other free compartment and the stock to be worked next can be brought on to the rollway. Now during the next working phase there is sufficient time for the gantry crane to store away the already worked stock and to bring forward the stock which is now next to be worked.

However even this procedure entails a lengthy expenditure of time for the change of stock, which is taken away from productive working time. This loss may still be tolerable if equipment of the known kind is being used for severing large numbers of pieces from one stock type. Then the stock change time is unimportant in comparison with the working time. If, however, it is intended to operate an installation which is to sever smaller numbers of pieces from different stocks then the stock change time gains decisive importance and thus has a considerable influence upon the economic use of the equipment.

SUMMARY OF THE INVENTION

It is an object of the invention to substantially reduce the time required to effect such stock transfers in installations of the type described above.

A further object of the invention is to reduce the weight of such installations, and thus their cost.

These and other objects are achieved, according to the invention, in an installation for storing a variety of elongate rod stock with their longitudinal dimensions all extending parallel to one another in a first direction and for automatically supplying a severing machine with that stock, which installation is composed of: a plurality of generally vertically extending shelving units spaced from one another in a second direction transverse to the first direction to define gangways between adjacent units and each presenting a generally vertically spaced plurality of shelving compartments projecting from at least one side of their associated shelving unit and each arranged to hold stock having a respective cross section, each shelving compartment being formed of a plurality of carrier arms extending in the second direction and spaced from one another in the first direction; a gantry crane including a crane bridge mounted for vertical movement in the gangways and horizontal movement in the second direction, and means carried by the bridge for conveying stock to and from selected compartments; and a rollway associated with one of the shelving units and spaced vertically from the compartments of the associated unit and including rollers projecting in the second direction toward the gangway at one side of its associated shelving unit and operable for conveying stock in a generally horizontal direction to and from the severing machine; the severing machine being located outside of the region occupied by the shelving units and the crane, by the provision of the following features:

the installation further includes a stock carrier located below the rollway and provided with means defining a stock supporting surface, the carrier being movable in the second direction between a stock-receiving position located directly below the rollway and a stock-transferring position located to one side of the shelving unit associated with the rollway and in the gangway at the one side of the associated unit; and means supporting the rollway for movement between a raised position for the conveying of stock to and from the severing machine and a lowered position substantially at the level of the carrier for permitting transfer of stock from the rollway to the carrier;

the rollway, when in its raised position, is spaced below the nearest compartment of its associated shelving unit by a distance sufficient to permit the crane bridge to be positioned directly above the rollway and beneath the nearest compartment; and the means carried by the crane bridge, the shelving compartment carrier arms, the rollers of the rollway and the means defining a supporting surface of the carrier are constructed for permitting the means carried by the crane bridge to move vertically between the shelving compartment carrier arms and the rollers to effect transfer of stock therebetween, for permitting the rollers to move vertically between the means defining a supporting surface of the carrier to effect transfer of stock from the rollway to the carrier, and for permitting the means carried by the crane bridge to move between the means defining a supporting surface of the carrier to effect transfer of stock from the carrier to the crane bridge.

In further accordance with the invention, the above-described installation can be operated, assuming that a first selected piece of stock is initially in the severing machine, by the following sequence of steps:

removing a second selected piece of stock from an associated one of the compartments by displacing the crane bridge vertically in a manner to cause the means carried by the crane bridge to move upwardly between the carrier arms of the associated compartment and to thereby pick up such piece of stock;

displacing the crane bridge to the position directly above the rollway;

maintaining the rollway in its raised position and operating the rollers to bring the first selected piece of stock away from the severing machine and onto the rollway;

causing the carrier to be in its stock-receiving position, moving the rollway to its lowered position and moving the carrier to its stock transferring position for causing the carrier to remove the first selected piece of stock from the rollway;

moving the rollway to its raised position and moving the crane bridge downwardly for causing the means carried by the crane bridge to move downwardly relative to, and between, the rollers to transfer the second selected piece of stock from the crane bridge to said rollway;

moving the crane bridge into the gangway at the one side of the shelving unit associated with the rollway to a position adjacent the carrier with the means carried by the crane bridge at approximately the same level as the carrier supporting surface;

displacing the crane bridge in the second direction toward the carrier for causing the means carried by the crane bridge to move between the means defining a supporting surface of the carrier to a position in which the means carried by the crane bridge underlie the first selected piece of stock; and moving the crane bridge vertically upwardly to take over support of the first selected piece of stock and then moving the crane bridge to return the first selected piece of stock to its associated shelving unit compartment.

The novel installation structure according to the invention distributes the operation of shifting worked stock away from the rollway on the one hand and that of transferring the stock next to be worked from the preliminary position into the position on the rollway to two components of the installation in such a way that both operations can proceed at the same time. Thus, while the rollway is still bringing worked stock down on to the carrier and the carrier is driving the worked stock into the neighboring shelving unit gangway, the cross member of the gantry crane is transferring the preliminarily positioned stock next to be worked to the position where it lies on the rollway in the normal position of the latter. When the rollway then comes up again from depositing the worked stock, its normal position is at the same time the position in which it receives the stock to be worked next, so that now it is only necessary for the cross member of the gantry crane to be driven away under the stock next to be worked, out of the rollway.

Now while the next material is being worked there is time enough for the crane to take up the previously worked stock from deposit in the storage gangway and bring it back into its shelving compartment, to fetch the stock next to be worked from another shelving compartment, and to wait with it in the preliminary position.

In comparison with known procedures, it results that the time for a stock interchange can at least be reduced to a quarter of the former time. Thus the installation according to the invention is especially suitable for locations where relatively small numbers of pieces are to be severed from a plurality of different stocks.

It has proved expedient to provide, as the means for taking up the stock, fork prongs carried by, and disposed beneath, the crane bridge and protruding to one side in the direction towards the shelving units, with the upper material-carrier edges or surface of the fork prongs extending with slight downward inclination from the crane bridge to their free end, and the fork prongs having at their free end a peg protruding upwardly above the carrier edge. Thus, and due to the vertical mobility of the fork prongs between the carrier arms of the shelving compartments, the possibility exists of driving the crane bridge in between the carrier arms of two compartments lying one above the other, for the withdrawal of stock from, or replacement of stock in, the stock compartments. Thus the length of the forks prongs need be adapted only to the largest stock cross section to be worked, so that a correspondingly reduced gangway width between the shelving units, and thus a correspondingly high specific storage capacity, result for the installation.

For this increase of the storage capacity it is also advantageous that the peg of the fork prongs can be made capable of being pivoted automatically out of the plane formed by the carrier edge of the fork prongs, about a substantially horizontal axis. As a result, the fork prongs can drive into the shelving compartments to take up stock in a height position at which their upper edge corresponds to the lowermost cross-sectional extent of the stock to be taken up. Thus they do not need to be driven into the shelving compartments firstly in a further lowered position to allow for the height given by the pegs. Thus the shelving compartments can be arranged one above the other with smaller spacings.

According to the invention it is further expedient for the fork prongs to include a first vertical light barrier or the like in the region of the peg and a second vertical light barrier or the like at a distance in front of the peg, and at the side thereof remote from the fork prong, for the control of the lifting out and replacement of the stock. Here the first light barrier serves, during driving of the crane bridge into a shelving compartment, to sense the front edge of the stock to be taken up. Then the further forward shifting of the crane takes place with the aid of a stepping motor or the like under program control in accordance with the cross section of the stock, which of course is contained in the program.

On the other hand the second light barrier serves, during replacement of stock and during driving of the crane bridge into the shelving compartment, to sense the forward edge of stock still lying there in order to halt the crane bridge at that moment and to cause the depositing of the returned stock.

However it is also possible to provide one of the fork prongs, on the free side of and directly adjacent to the peg, with a light barrier for controlling the lifting out and replacement of the stock. In this case, during driving of the crane bridge into a shelving compartment the light barrier senses the forward edge of the stock to be taken, and then the crane is advanced with the aid of a stepping motor or the like under program control in accordance with the cross section of the stock plus the cross section of the peg. On the other hand, during replacement of stock, the same light barrier senses the forward edge of the stock still lying in the allocated compartment and halts the crane bridge, whereupon the depositing of the returned stock can take place.

For both above-mentioned cases it can further be especially expedient to arrange the light barriers on the fork prong nearest to the severing machine, to direct the light beams of the light barriers obliquely in the direction toward the side of the shelving zone on which the severing machine lies, and to cause the light beams to there cooperate, outside the shelving zone, with a counterpart in the form of a mirror or the like fitted on the gantry crane. This creates the possibility of considerably reducing the height range necessary for the crane bridge between the shelving compartments. Thus the shelving compartments can have different heights and they need not all be designed, in height, for the maximum stock cross section. Rather material compartments for large stock cross sections and material compartments for small stock cross sections can be provided. The minimum interval of the individual shelving compartments, considered in height, now depends only upon the height of the carrier cross section of the crane bridge.

As regards the rollway, it is advantageous if this is inclined slightly downwardly in the direction towards the shelving unit supports and includes, besides the shelving unit supports, a stock abutment formed of rollers rotatable about a vertical axis.

It is further expedient for the carrier for the worked stock, which is movable transversely of the stock longitudinal direction, to be a transport truck with a plurality of vertical flanges aligned with one another in the stock longitudinal direction and parallel to the fork prongs, the rollers of the rollway and the carrier arms of the shelving compartments, for the upper edges of the flanges, serving to carry the stock, to be inclined slightly downwardly in the direction towards the vertical guide of the rollway, and for the flanges there to have an upwardly protruding abutment edge for the stock.

Finally it is essential to the invention that, in the case of stock with a rectangular cross section or a rectangular circumferential contour stored in a shelving compartment, the individual stock rods have, transversely of their longitudinal extent, a spacing corresponding at least to the horizontal maximum cross section of the pegs. By itself, this spacing occurs of its own accord when stock is introduced by the gantry crane. However, for the cases where the storing of stock may be effected by other meas, provision must be made for establishing the desired spacing.

DESCRIPTION OF THE PREFERRED EMBODIMENTS

Figure 1:
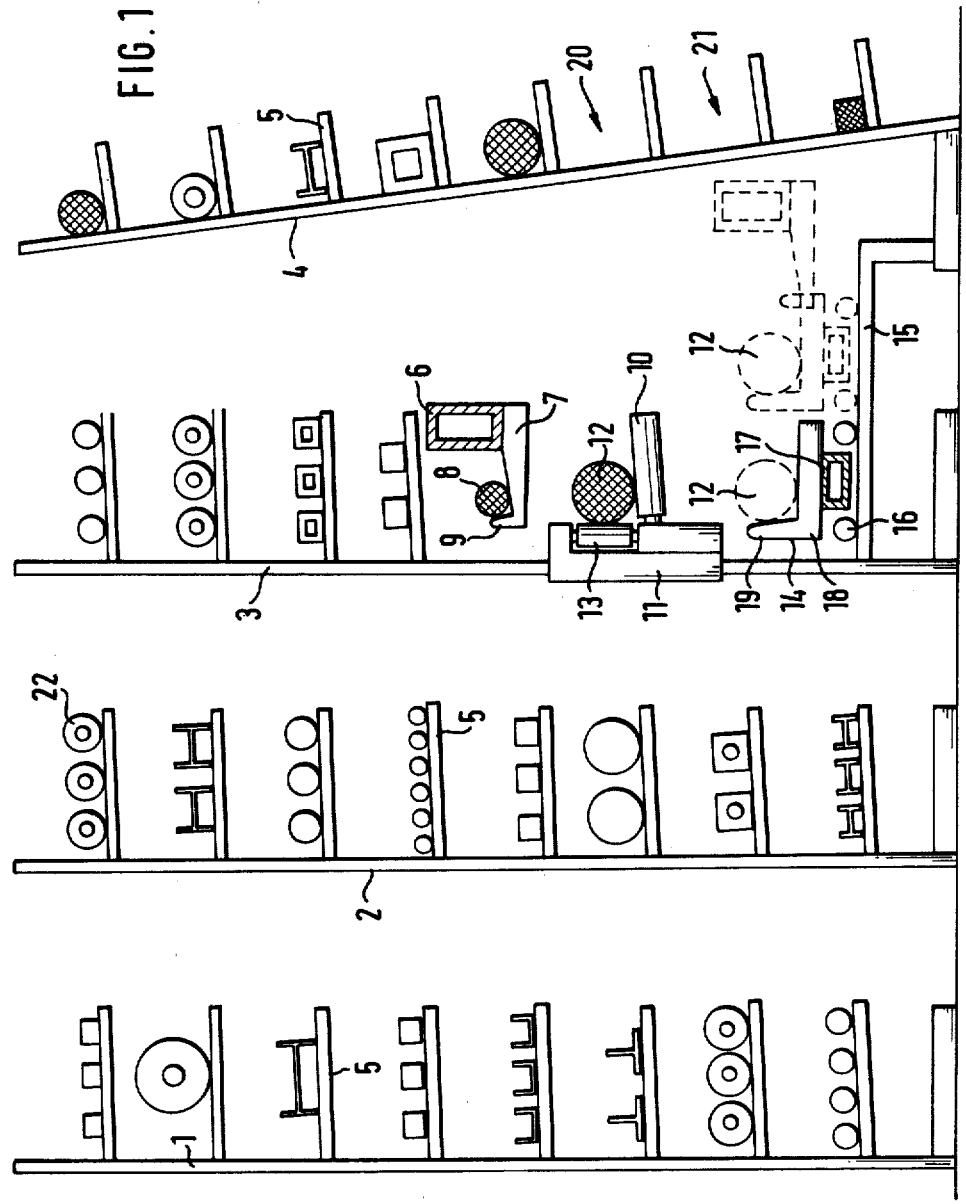
FIG. 1 is a side elevational view of a storage and supply installation according to a preferred embodiment of the invention.

The installation shown in FIG. 1 is composed of shelving units 1 to 4 in a series arranged side by side, forming shelving compartments one above the other on a corresponding side of each unit by means of carrier arms 5 spaced vertically from one another and extending normal to the plane of FIG. 1.

Above the shelving units, which are positioned side by side and are of equal extent normal to the plane of FIG. 1, a conventional gantry crane (not shown) is mounted on vertical supports which run on rails (likewise not shown) before and behind the shelving units, when viewed perpendicularly to the plane of FIG. 1. The gantry crane has a crane bridge 6 which is movable into the shelving gangways existing between the shelving units, and also into the shelving compartments. On its underside the crane bridge 6 carries a plurality of fork prongs 7 in alignment with, and spaced from, one another perpendicularly of the plane of FIG. 1. The carrier edge of each prong, for supporting stock 8, is inclined downwardly away from the crane bridge 6 and is delimited at the free end of the prong by a peg 9 serving as an abutment for the stock 8.

A rollway 10 is mounted by means of sliders 11 on vertical parts of the shelving unit 3 for vertical movement therealong. The rollway 10 is likewise inclined slightly downwardly to the left, so that the stock 12 situated on it can come to abut on vertical guide rollers 13 of the rollway.

The rollway 10 is illustrated in FIG. 1 in its upper position in which it can feed a stock item 12 in the direction perpendicular to the plane of FIG. 1 to a severing machine arranged beside the shelving units, and bring it back again from this machine. From the position illustrated the rollway 10 can be driven downwardly to an extent sufficient to allow the stock 12 to be brought onto a carrier truck 14, into the position as illustrated there by a broken line circle.

The carrier truck 14 is mounted on wheels 15 by which it is movable to and fro parallel to the plane of FIG. 1 on rails 15 between the position illustrated in solid lines and that in broken lines. It consists essentially of a chassis 17 having wheels 16 mounted thereon and flanges 18 arranged on the chassis. The upper edges of the flanges are inclined somewhat downwardly to the left and are limited at their lowest point by substantially vertical abutment flanges 19 for retaining the stock 12.

The shelving unit 4, which can be inclined as shown in FIG. 1, is loaded with stock from the right in a manner not further illustrated, and serves for making available those stock types which are to be worked only relatively infrequently. When such stock from the shelving unit has been worked, it is taken out of the associated compartment of the shelving unit 4 again and replaced by another stock intended to be worked shortly. On the other hand, in the shelving units 1 to 3 there are stored stock types which are to be worked more frequently and the storage of which in the vicinity of the severing machine is therefore advantageous.

In the operating state shown in FIG. 1, stock 8 was taken from the compartment 20 and stock 12 from the compartment 21 of the shelving unit 4.

The manner of operation of the equipment as described so far is as follows:

At the beginning, the gantry crane has already brought stock 12 out of compartment 21 by means of the crane bridge 5 and deposited it on the rollway 10. Thence it is fed to the severing machine by way of a further rollway preceding the severing machine and placed outside the shelving zone, and is taken over by, and worked in, the severing machine.

During this time the crane bridge 6 has conveyed stock 8 out of the compartment 20 of the shelving unit 4 and now stands ready in the position as shown in FIG. 1, until the stock 12 has come back again from the severing machine, as shown in FIG. 1. Then as the next action there occur during the same time period, lowering of the rollway 10 so far that the stock 12 is brought into the position shown in broken lines on the truck 14, and lowering of the crane bridge 6 so far that the stock 8 comes into the position of the stock 12 shown in solid lines in FIG. 1.

When the rollway 10 has been lowered and the stock 12 is lying on the truck 14, the latter is driven to the right into the position shown in broken lines, so that the abutments 19 roll or slide the stock 12 off of the rollway 10. Now the rollway is raised again into the position as illustrated in FIG. 1, where then the stock 8, already held ready there by the fork prongs 7, comes to lie directly on the rollway 10. Even while the crane bridge 6 is being driven away with the prongs 7 underneath the stock 8 lying on the rollway 10, the stock 8 can then be fed by the rollway 10 to the severing machine.

The crane bridge 6 is then driven into the position shown in broken lines at the bottom right in FIG. 1 and thence to beneath the stock 12 and to the left in order to take this from the truck 14 and bring it back into the compartment 21. While the crane bridge 6 is returning the stock 12 to compartment 21, the truck 14 is driven back again into the position shown in solid lines in FIG. 1.

After the crane bridge 6 has brought the stock 12 back into the compartment 21, it fetches, for example, stock 22 from the shelving unit 2 and then goes again into the waiting position above the rollway 10, as shown in solid lines in FIG. 1.

So that the movements as described can proceed without collision the carrier arms 5 of the shelving units, the fork prongs 7, the rollers of the rollway 10, the sliders 11 and the flanges 18 are staggered in relation to one another perpendicular of the plane of FIG. 1 in such a manner that the fork prongs 7 of the crane bridge 6 can be driven vertically through the shelving compartments, if empty, as well as through the rollway 10 and the flanges 18, and also the rollers of the rollway 10 can descend vertically between the flanges 18.

Figure 2:
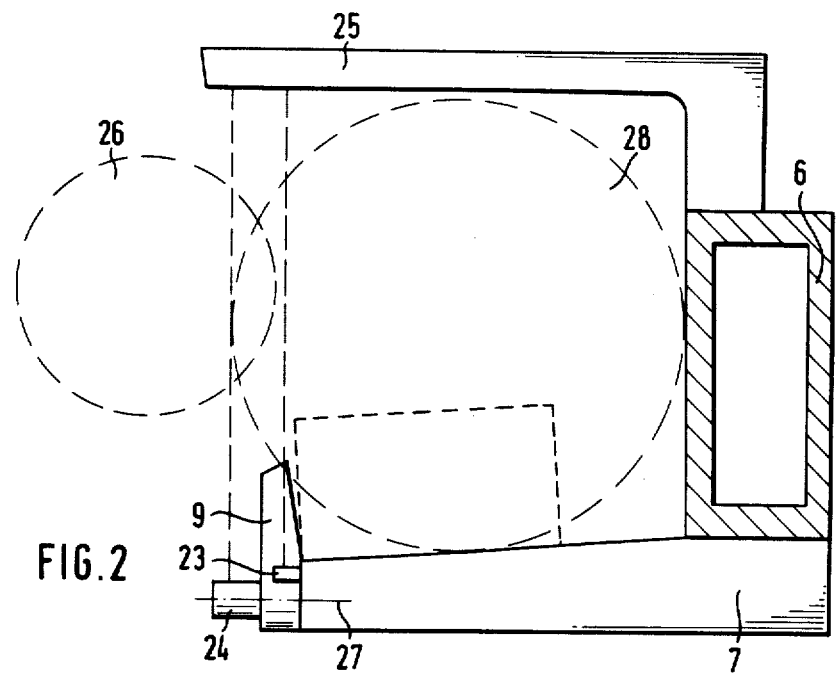
FIG. 2 is a side elevational detail view of the crane bridge of the installation of FIG. 1, to an enlarged scale.

The crane bridge 6 is illustrated to a larger scale and in greater detail in FIG. 2. There it can be seen that the fork prongs 7 contain a vertical light barrier 23 at the front in the region of the peg 9 and a further vertical light barrier 24 at a distance ahead of barrier 23. Both barriers cooperate with a counterpart, for example a reflector 25, which is fitted above the crane bridge 6.

For bringing stock to rollway 10, the light barrier 23 serves to sense the forward edge of the stock during driving of the crane bridge into a shelving compartment. When this has taken place the crane bridge or the gantry crane is driven further with the aid of a stepping motor or the like by a distance determined by the cross section of the stock in each case, which information is contained in the program control system. Thereupon, the unit of crane bridge 6 and fork prongs 7 can take up the respective stock and convey it for working.

On the other hand, the light barrier 24 located at a distance in front of the light barrier 23 serves to aid return of the worked stock to storage. When the stock to be replaced in storage is driven into the allocated shelving compartment, the light barrier 24 senses the forward edge of the next stock lying there. Now the horizontal movement of the gantry crane is halted and the returned stock can be deposited, the distance of the replaced stock from the stock still in storage being determined by the distance between the light barriers 23 and 24. The distance between adjacent pieces of stock must be dimensioned so that for the renewed delivery of stock rod the pegs 9 can drive in between two adjacent stock rods. This applies especially to stock with rectangular cross section the lower edges of which would immediately adjoin one another so that the pegs 9 could not enter between them, if there were no spacing between adjacent pieces of stock.

FIG. 2 also shows a possibility for making the height of the unit formed from crane bridge 6, fork prongs 7, pegs 9 and part 25 as small as possible in relation to the maximum cross section of the stock. Normally only a maximum stock cross section 26 could occur. If however the pegs 9 are so formed that they are automatically pivotal through 90° about an axis 27 while taking up and depositing stock, then with the same dimensioning of the parts of the crane bridge a maximum stock cross section 28 can be accomodated. Correspondingly, the vertical intervals between shelving compartments can be reduced when pegs pivotable in the described manner are used.

Due to the fact that the crane bridge 6 can now drive with the fork prongs 7 into the shelving compartments it also results that the free gangways between the shelving units no longer have to have a width going beyond the shelving compartment depth, but essentially need only have a width which corresponds to the maximum stock cross section 28, taking into account the cross section of the crane bridge 6.

Figure 3:
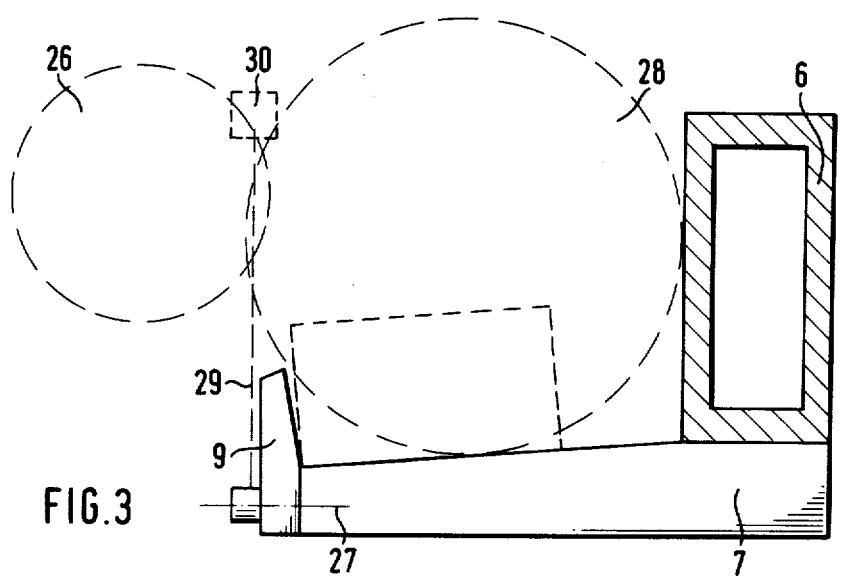
FIG. 3 is a view similar to that of FIG. 2 of another embodiment of the crane bridge.

FIG. 3 shows another possible structure for the crane bridge. Here a single light barrier 29 is arranged directly in front of peg 9. Its beam moreover does not shine vertically upwards against a reflector similar to the part 25 in FIG. 2, but against a reflector 30 which is fitted obliquely outside the shelving zone on the vertical support of the gantry crane. The beam 29 thus proceeds, in the illustration in FIG. 3, from its lower origin obliquely upwards, forward of the plane of FIG. 3, onto the reflector 30 which is driven with the gantry crane outside the shelving zone. Thus, as may be seen in comparison with FIG. 2, the necessary height for the crane bridge between the neighboring shelving units is considerably reduced, so that correspondingly lower shelving compartments can be provided for stock types with smaller cross sections, than are necessary for stock types 28 with large cross section.

In the case of the embodiments shown both in FIG. 2 and in FIG. 3, it is expedient if only the fork prong 7 nearest to the severing machine is provided with light barriers. This means that the stock, irrespective of its length, is always stored in the shelving compartments in such a way that its end nearer to the severing machine lies at the limit of the shelving zone facing the severing machine. This moreover corresponds to a most extensive shortening of the material path from the rollway 10 to the severing machine and from the severing machine back to the rollway 10.

In an exemplary installation according to the invention, prongs 7, carrier arms 5 and flanges 18 can all be constituted by structural pieces of rectangular cross section, with the major cross-sectional dimension oriented vertically.

Figure 4:
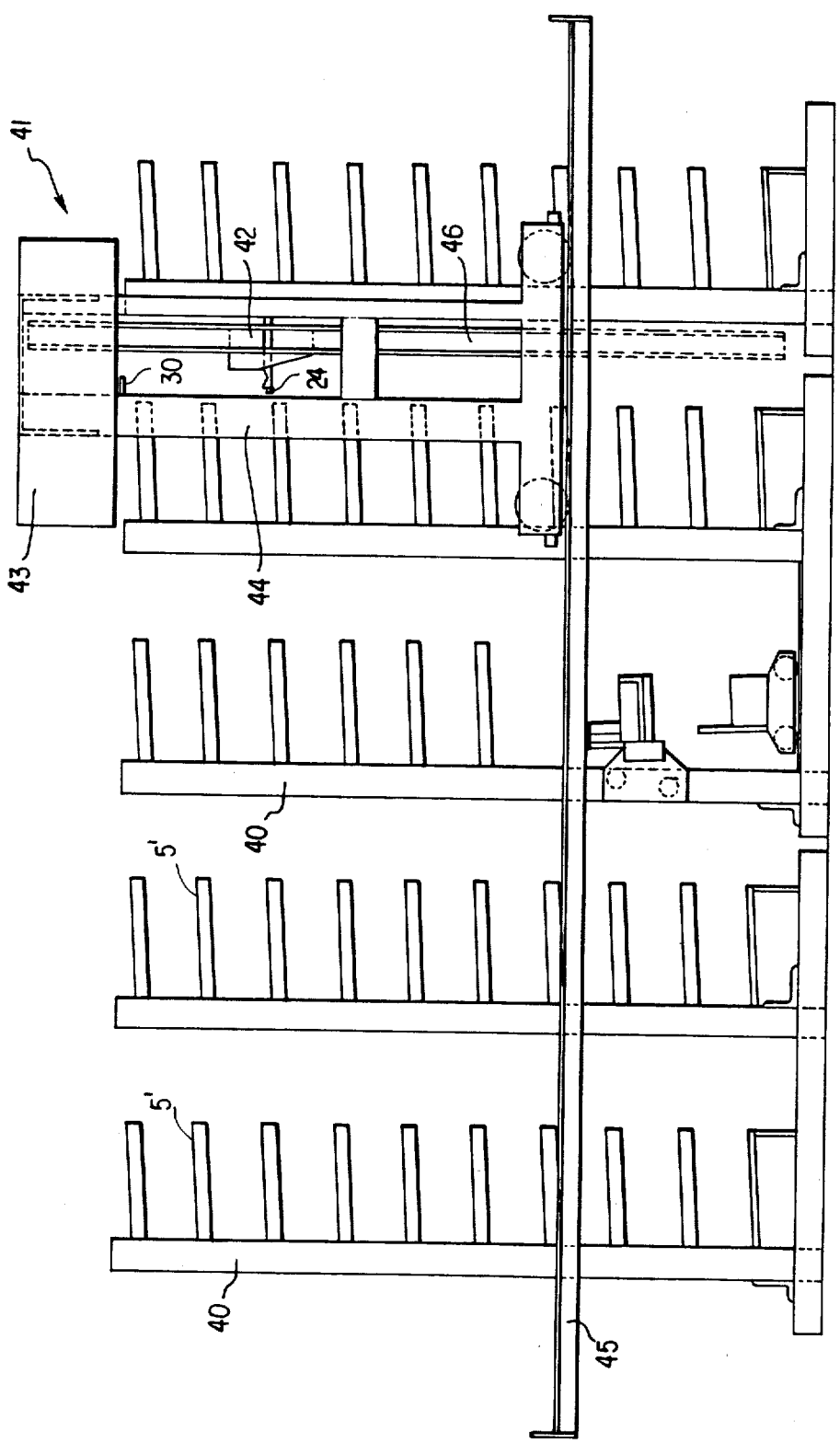
FIG. 4 is a side elevational view similar to that of FIG. 1.

FIG. 4 shows shelving units 40 and a gantry crane 41 with a crane bridge 42, a crane head 43 and vertical legs 44 extending downwards from both ends of the head 43. Legs 44 are displaceably supported on horizontally extending rails 45, with one rail 45 being disposed in front and the other rail being disposed behind the shelving units 40. Crane bridge 42 is vertically displaceable along guides 46 which are telescopically extensible as shown in dotted lines so that the bridge 42 can move downwardly to the lowest carrier arms 5' of the shelving units 40.

FIG. 4 also shows a light barrier 24, carried by one prong of crane head 42, and a reflector 30 carried by one vertical leg 44.

Figure 5:
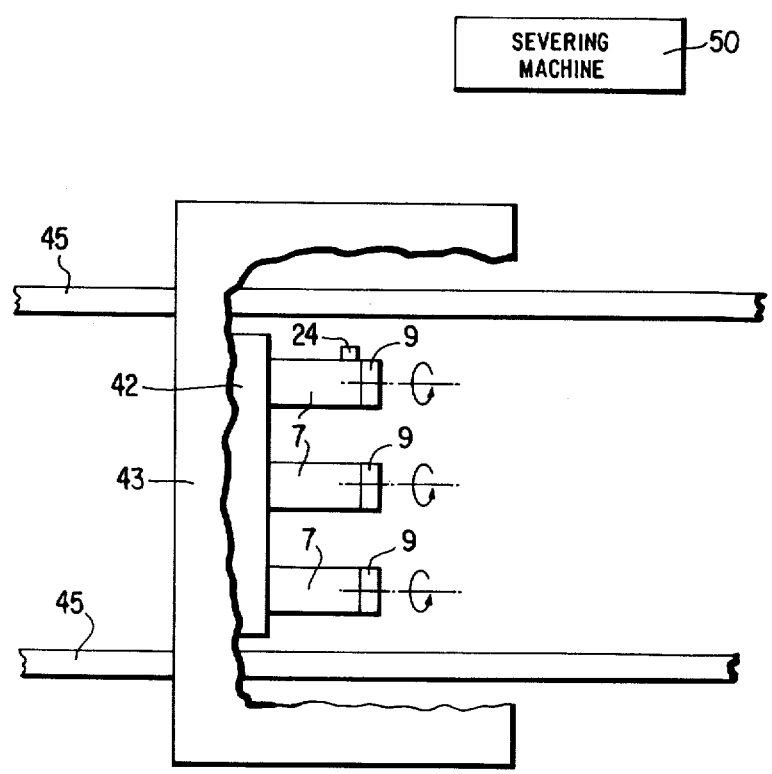
FIG. 5 is a plan view of parts of the gantry crane of FIG. 4.

FIG. 5 is a plan view showing parts of the gantry crane of FIG. 4 with part of crane head 43 broken away to show three prongs 7 carried by crane bridge 42. Each prong carriers a peg 9 pivotal about a horizontal axis as shown by the circular arrows. The fork 7 closest to severing machine 50 carries the light barrier 24.

It will be understood that the above description of the present invention is susceptible to various modifications, changes and adaptations, and the same are intended to be comprehended within the meaning and range of equivalents of the appended claims.

What is claimed is:

1. In an installation for storing a variety of elongate rock stock with their longitudinal dimensions all extending parallel to one another in a first direction and for automatically supplying a severing machine with that stock, which installation is composed of: a plurality of generally vertically extending shelving units spaced from one another in a second direction transverse to the first direction to define gangways between adjacent units and each presenting a generally vertically spaced plurality of shelving compartments projecting from at least one side of their associated shelving unit and each arranged to hold stock having a respective cross section, each shelving compartment being formed of a plurality of carrier arms extending in the second direction and spaced from one another in the first direction; a gantry crane including a crane bridge mounted for vertical movement in the gangways and horizontal movement in the second direction, and means carried by the bridge for conveying stock to and from selected compartments; and a rollway associated with one of the shelving units and spaced vertically from the compartments of the associated unit and including rollers projecting in the second direction toward the gangway at one side of its associated shelving unit and operable for conveying stock in a generally horizontal direction to and from the severing machine; the severing machine being located outside of the region occupied by the shelving units and the crane, the improvement wherein:

said installation further comprises a stock carrier located below said rollway and provided with means defining a stock supporting surface, said carrier being movable in the second direction between a stock-receiving position located directly below said rollway and a stock-transferring position located to one side of said shelving unit associated with said rollway and in the gangway at said one side of said associated unit; and means supporting said rollway for movement between a raised position for the conveying of stock to and from the severing machine and a lowered position substantially at the level of said carrier for permitting transfer of stock from said rollway to said carrier; said rollway, when in its raised position, is spaced below the nearest compartment of its associated shelving unit by a distance sufficient to permit said crane bridge to be positioned directly above said rollway and beneath said nearest compartment; and said means carried by said crane bridge, said shelving compartment carrier arms, said rollers of said rollway and said means defining a supporting surface of said carrier are constructed for permitting said means carried by said crane bridge to move vertically between said shelving compartment carrier arms and said rollers to effect transfer of stock therebetween, for permitting said rollers to move vertically between said means defining a supporting surface of said carrier to effect transfer of stock from said rollway to said carrier, and for permitting said means carried by said crane bridge to move between said means defining a supporting surface of said carrier to effect transfer of stock from said carrier to said crane bridge.

2. A method for conveying stock in the installation defined in claim 1, in which a first selected piece of stock is initially in the severing machine, comprising, in the order recited:

removing a second selected piece of stock from an associated one of said compartments by displacing said crane bridge vertically in a manner to cause said means carried by said crane bridge to move upwardly between said carrier arms of said associated compartment and to thereby pick up such piece of stock;

displacing said crane bridge to said position directly above said rollway;

maintaining said rollway in its raised position and operating said rollers to bring the first selected piece of stock away from the severing machine and onto said rollway;

causing said carrier to be in its stock-receiving position, moving said rollway to its lowered position and moving said carrier to its stock transferring position for causing said carrier to remove the first selected piece of stock from said rollway;

moving said rollway to its raised position and moving said crane bridge downwardly for causing said means carried by said crane bridge to move downwardly relative to, and between, said rollers to transfer the second selected piece of stock from said crane bridge to said rollway;

moving said crane bridge into said gangway at said one side of said shelving unit associated with said rollway to a position adjacent said carrier with said means carried by said crane bridge at approximately the same level as said carrier supporting surface;

displacing said crane bridge in said second direction toward said carrier for causing said means carried by said crane bridge to move between said means defining a supporting surface of said carrier to a position in which said means carried by said crane bridge underlie the first selected piece of stock; and moving said crane bridge vertically upwardly to take over support of the first selected piece of stock and then moving said crane bridge to return the first selected piece of stock to its associated shelving unit compartment.

3. An arrangement as defined in claim 1 wherein said means carried by said crane bridge comprise: a plurality of fork prongs protruding from said bridge in said second direction, and spaced from one another in said first direction, each said fork prong presenting an upper surface which is inclined downwardly from said crane bridge, for supporting stock; and a plurality of pegs each mounted at a free end of a respective prong to protrude upwardly above said upper surface.

4. An arrangement as defined in claim 3 further comprising means supporting each said peg for pivotal movement about a substantially horizontal axis to a lowered position not above said upper surface.

5. An arrangement as defined in claim 1 wherein the outer end of each said peg is pointed.

6. An arrangement as defined in claim 3, 4 or 5 wherein said crane further comprises means defining a first light barrier inclined to the horizontal in the region of at least one said peg, and means defining a second light barrier inclined to the horizontal and spaced from said first barrier in the direction away from said crane bridge, said barriers being fixed relative to said prongs and being arranged to detect movement of stock thereacross for controlling transfer of stock to and from said compartments.

7. An arrangement as defined in claim 6 wherein the lower end of each said light barrier is defined by a first member disposed at that one of said fork prongs which is closest to the location of the severing machine and the upper end of each said light barrier is defined by a second member carried by said gantry crane and positioned to the side of said shelving units directed toward the severing machine and closer to the location of the severing machine than is said first member such that each said light barrier extends at an angle to the vertical.

8. An arrangement as defined in claim 3, 4 or 5 wherein said crane further comprises means defining at least one light barrier located directly adjacent one said peg at the side thereof remote from said crane bridge, said barrier being fixed relative to said prongs and being arranged to detect movement of stock thereacross for controlling transfer of stock to and from said compartments.

9. An arrangement as defined in claim 8 wherein the lower end of said light barrier is defined by a first member disposed at that one of said fork prongs which is closest to the location of the severing machine and the upper end of said light barrier is defined by a second member carried by said gantry crane and closer to the location of the severing machine than is said first member positioned to the side of said shelving units directed toward the severing machine and such that said light barrier extends at an angle to the vertical.

10. An arrangement as defined in claim 1 wherein said rollers of said rollway are inclined downwardly in the direction away from said gangway at said one side of said shelving unit with which said rollway is associated, and said rollway further comprises at least one additional roller mounted to rotate about a substantially vertical axis and providing a stock abutment adjacent the lower end of said first-recited rollers.

11. Arrangement as defined in claim 1 or 3 wherein said carrier is a transport truck, said means defining a supporting surface comprise a plurality of vertically oriented flanges extending in said second direction parallel to one another and spaced apart in said first direction, with the upper edges of said flanges defining said supporting surface and being inclined slightly downwardly in the direction toward said stock-receiving position, and each said flange is provided with an upwardly protruding abutment edge at the end thereof facing in the direction toward said stock-receiving position.

12. An arrangement as defined in claim 1 wherein each said shelving unit further comprises vertical support members from which said carrier arms projected in said second direction and the upper surfaces of said carrier arms are inclined downwardly in the direction toward said support members.

* * * * *